United States Patent
Kaharu et al.

(10) Patent No.: US 11,944,093 B2
(45) Date of Patent: Apr. 2, 2024

(54) SPREADING AGENT FOR AGROCHEMICALS, AND AGROCHEMICAL SPRAY SOLUTION

(71) Applicant: KURARAY CO., LTD., Kurashiki (JP)

(72) Inventors: Taeko Kaharu, Kanagawa (JP); Keisuke Morikawa, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 655 days.

(21) Appl. No.: 16/978,509

(22) PCT Filed: Mar. 7, 2019

(86) PCT No.: PCT/JP2019/009127
§ 371 (c)(1),
(2) Date: Sep. 4, 2020

(87) PCT Pub. No.: WO2019/172381
PCT Pub. Date: Sep. 12, 2019

(65) Prior Publication Data
US 2020/0396990 A1    Dec. 24, 2020

(30) Foreign Application Priority Data
Mar. 8, 2018 (JP) ................. 2018-042318

(51) Int. Cl.
*A01N 25/24* (2006.01)
*A01N 37/36* (2006.01)
*C08K 3/105* (2018.01)
*C08K 3/28* (2006.01)

(52) U.S. Cl.
CPC .............. *A01N 25/24* (2013.01); *A01N 37/36* (2013.01); *C08K 3/105* (2018.01); *C08K 3/28* (2013.01)

(58) Field of Classification Search
CPC ........ A01N 25/24; A01N 37/36; C08K 3/105; C08K 3/28
See application file for complete search history.

(56) References Cited

U.S. PATENT DOCUMENTS

| 2016/0251466 A1 | 9/2016 | Kato et al. |
| 2016/0262381 A1 | 9/2016 | Furo et al. |
| 2017/0275394 A1 | 9/2017 | Mori et al. |

FOREIGN PATENT DOCUMENTS

| CN | 106715493 A | 5/2017 |
| JP | 8-217604 A | 8/1996 |
| JP | 2000-1404 A | 1/2000 |
| JP | 2015-54964 A | 3/2015 |
| JP | 2015-134704 A | 7/2015 |
| JP | 2018-76239 A | 5/2018 |
| WO | WO 2012/087821 A1 | 6/2012 |
| WO | 2016/103717 A1 * | 6/2016 |

OTHER PUBLICATIONS

Kaolin Clay for Pest Management (accessed on Mar. 29, 2023, accessed from https://www.gardeninginthedesert.com/kaolin-clay-for-pest-management/, pp. 1-4). (Year: 2023).*
EPA fact sheet for kaolin ("Kaolin (100104) Fact Sheet" accessed on Oct. 23, 2023, pp. 1-2, accessed from https://www3.epa.gov/pesticides/chem_search/reg_actions/registration/fs_PC-100104_01-Jun-99.pdf—of record in PTO-892 attached to this office action). (Year: 2023).*
Combined Chinese Office Action and Search Report dated Jul. 5, 2021 in corresponding Chinese Patent Application No. 201980017840.X (with English Translation and English Translation of Category of Cited Documents), 18 pages.
Zheng, Pharmaceutical Polymer Materials, China Pharmaceutical Science and Technology, Press, Aug. 2000, 3 pages.
Jiang Long et al., Adhesion, vol. 35, No. 3, Mar. 2014, pp. 031-035 (with English Abstract).
Extended European Search Report dated Oct. 27, 2021 in corresponding European Patent Application No. 19764551.8, 9 pages.
Hu Y. et al., "Stability of $BaTiO_3$ Aqueous Suspensions with PVA-b-COOH", Materials Science and Engineering: B99, Elsevier, vol. 99, No. 1-3, XP004433422, May 25, 2003, pp. 520-522.
International Search Report dated May 28, 2019 in PCT/JP2019/009127 filed on Mar. 7, 2019, 2 pages.

* cited by examiner

*Primary Examiner* — Alma Pipic
(74) *Attorney, Agent, or Firm* — Oblon, McClelland, Maier & Neustadt, L.L.P.

(57) ABSTRACT

The present invention provides a spreading agent for agrochemicals having superior adhesion particularly for plant surface. The present invention also provides an agrochemical spray solution having a reduced risk of leaving the spreading agent for agrochemicals on a plant surface. The present invention relates to a spreading agent for agrochemicals comprising a carboxy-modified vinyl alcohol polymer (A) having a carboxy-containing monomer unit content of 0.1 mol % to 10 mol %, a viscosity-average degree of polymerization of 200 to 5,000, and a degree of saponification of 65 mol % to 99.9 mol %.

9 Claims, No Drawings

SPREADING AGENT FOR AGROCHEMICALS, AND AGROCHEMICAL SPRAY SOLUTION

TECHNICAL FIELD

The present invention relates to a spreading agent for agrochemicals comprising a carboxy-modified vinyl alcohol polymer and having superior adhesion particularly for plant surface, and to an agrochemical spray solution having a reduced risk of leaving the spreading agent for agrochemicals on a plant surface.

BACKGROUND ART

A spray solution as a dilute aqueous solution of agrichemicals is in common use in agriculture. However, because of the water-repellent, waxy or thread-like substances present on plant surfaces and the surfaces of insect bodies, the spray solution does not easily stick to these surfaces when directly sprayed onto a plant surface, and the active component of the agrichemicals contained in the solution often fails to retain its prolonged effect as a result of running off the surface such as when there is rain, or falling down to the ground by being removed by winds.

Against this backdrop, an agrochemical spray solution containing a spreading agent has been used to make the active component of agrichemicals more sticky or adherent to a plant surface. Examples of spreading agents that are currently in common use include polyoxyethylene alkyl phenyl ether, polyoxyethylene alkyl ether, polyoxyethylene fatty acid ester, lignin sulfonate, and naphthyl methane sulfonate, which all have the property to lower the surface tension of spray solution to improve stickiness or spreadability against not easily wettable insect bodies and crop plants for improved protection against insects. A drawback, however, is that these common spreading agents have a very strong affinity for water, and it is still not possible to reduce run-off, such as when there is rain. Adherent spreading agents, such as polyoxyethylene resin acid ester, paraffin, and polyvinyl acetate are available. However, these spreading agents also involve a number of issues, including inability to show effect in low concentrations, and formation of a coating that, once dried, does not dissolve in water, and stays on plant surface for prolonged time periods.

Partially saponified or low saponified polyvinyl alcohol-containing agrichemical adhesive compositions and liquid spray solutions for agriculture have been proposed, as disclosed in Patent Literature 1 and Patent Literature 2. However, the polyvinyl alcohol disclosed in Patent Literature 1 is insufficient in terms of adhesion because it easily dissolves in water, and the agrichemicals easily run off such as when there is rain. The polyvinyl alcohol of Patent Literature 2 requires a mixed solvent of water and alcohol for use, and has a high impact on the environment.

Patent Literature 3 proposes a spreading agent composition for agrochemicals containing a sorbitan fatty acid ester, a polyoxyethylene alkyl ether, and a polyether-modified silicone. However, because the coating that forms on plant surface is insoluble in water, the agrichemical component persistently remains on plant surface with the spreading agent composition of Patent Literature 3. That is, no agrochemical spray solution is available that provides desirable initial adhesion for plant surface, and that has a reduced risk of leaving the agrichemical component on a plant surface after a predetermined lapse of time.

CITATION LIST

Patent Literature

Patent Literature 1: JP 8(1996)-217604 A
Patent Literature 2: JP 2015-134704 A
Patent Literature 3: JP 2000-1404 A

SUMMARY OF INVENTION

Technical Problem

The present invention has been made to find a solution to the foregoing problems, and it is an object of the present invention to provide a spreading agent for agrochemicals having superior adhesion particularly for plant surface. Another object of the present invention is to provide an agrochemical spray solution having a reduced risk of leaving the spreading agent for agrochemicals on a plant surface.

Solution to Problem

The present inventors conducted extensive studies, and found that the foregoing problems can be solved with a spreading agent for agrochemicals that comprises a specific carboxy-modified vinyl alcohol polymer. The present invention was completed on the basis of this finding.

Specifically, the present invention includes the following.

[1] A spreading agent for agrochemicals, comprising a carboxy-modified vinyl alcohol polymer (A) having a carboxy-containing monomer unit content of 0.1 mol % to 10 mol %, a viscosity-average degree of polymerization of 200 to 5,000, and a degree of saponification of 65 mol % to 99.9 mol %.

[2] The spreading agent for agrochemicals of [1], further comprising 0.001 parts by mass to 25 parts by mass of a polyvalent metal ionizable compound (B) relative to 100 parts by mass of the carboxy-modified vinyl alcohol polymer (A).

[3] The spreading agent for agrochemicals of [2], wherein the polyvalent metal ionizable compound (B) is an organic salt or an inorganic salt.

[4] The spreading agent for agrochemicals of [3], wherein the organic salt or the inorganic salt comprises a cation that is at least one selected from the group consisting of an alkali earth metal ion, a transition metal ion, an aluminum ion ($Al^{3+}$), and a zinc ion ($Zn^{2+}$).

[5] The spreading agent for agrochemicals of [3] or [4], wherein the organic salt or the inorganic salt comprises an anion that is at least one selected from the group consisting of an acetate ion ($CH_3COO^-$), a carbonate ion ($CO_3^{2-}$), a hydroxide ion ($OH^-$), an iodide ion ($I^-$), a chloride ion ($Cl^-$), a bromide ion ($Br^-$), a nitrate ion ($NO_3^-$), a sulfate ion ($SO_4^{2-}$), an orthosilicate ion ($SiO_4^{4-}$), and a phosphate ion ($PO_4^{3-}$).

[6] The spreading agent for agrochemicals of any one of [1] to [5], wherein the carboxy-containing monomer is at least one selected from the group consisting of an ethylenic unsaturated monocarboxylic acid and a derivative thereof, and an ethylenic unsaturated dicarboxylic acid and a derivative thereof.

[7] The spreading agent for agrochemicals of [6], wherein the ethylenic unsaturated monocarboxylic acid and the derivative thereof are at least one selected from the group consisting of (meth)acrylic acid or a salt thereof, methyl (meth)acrylate, ethyl (meth)acrylate, n-propyl (meth)acrylate, and isopropyl (meth)acrylate.

[8] The spreading agent for agrochemicals of [6], wherein the ethylenic unsaturated dicarboxylic acid and the derivative thereof are at least one selected from the group consisting of maleic acid or a salt thereof, a maleic acid ester, itaconic acid or a salt thereof, an itaconic acid ester, fumaric acid or a salt thereof, a fumaric acid ester, maleic anhydride, and itaconic anhydride or a derivative thereof.

[9] The spreading agent for agrochemicals of any one of [1] to [8], wherein the carboxy-containing monomer is at least one selected from the group consisting of maleic acid, monomethyl maleate, dimethyl maleate, itaconic acid, monomethyl itaconate, dimethyl itaconate, (meth)acrylic acid, and methyl (meth)acrylate.

[10] An agrochemical spray solution comprising the spreading agent for agrochemicals of any one of [1] to [9], an active agrichemical component, and water.

[11] The agrochemical spray solution of [10], wherein the agrochemical spray solution comprises 0.1 parts by mass to 1,000 parts by mass of the active agrichemical component relative to 100 parts by mass of the carboxy-modified vinyl alcohol polymer (A).

Advantageous Effects of Invention

A spreading agent for agrochemicals of the present invention has superior adhesion, particularly for plant surface. An agrochemical spray solution comprising the spreading agent for agrochemicals has a reduced risk of remaining on a plant surface while maintaining superior adhesion for plant surface. The spreading agent for agrochemicals of the present invention also allows for use of water as a solvent, and has a reduced impact on the environment in use.

DESCRIPTION OF EMBODIMENTS

The following specifically describes a spreading agent for agrochemicals of the present invention, and an agrochemical spray solution of the present invention. It is to be noted that the present invention is not limited to the embodiments described below. In the present specification, the upper limits and lower limits of numeric ranges (for example, ranges of contents of components, ranges of values calculated from components, and numeric ranges of physical properties) can be combined appropriately.

Spreading Agent for Agrochemicals

A spreading agent for agrochemicals of the present invention comprises a carboxy-modified vinyl alcohol polymer (A) (hereinafter, "vinyl alcohol polymer" will be referred to also as "PVA") having a carboxy-containing monomer unit content of 0.1 mol % to 10 mol %, a viscosity-average degree of polymerization of 200 to 5,000, and a degree of saponification of 65 mol % to 99.9 mol %. By containing the carboxy-modified PVA (A), a spreading agent for agrochemicals of the present invention has superior initial adhesion for plant surface, and can prevent run-off of the agrichemical such as when there is rain. An agrochemical spray solution comprising the spreading agent for agrochemicals has a reduced risk of remaining on a plant surface.

Carboxy-Modified PVA (A)

In the carboxy-modified PVA (A), the content of the carboxy-containing monomer unit is 0.1 mol % to 10 mol %, preferably 0.3 mol % to 8 mol %, more preferably 0.5 mol % to 5 mol %. The agrochemical spray solution obtained has an increased risk of remaining on a plant surface when the carboxy-containing monomer unit content is less than 0.1 mol %. With a carboxy-containing monomer unit content of more than 10 mol %, the agrochemical spray solution obtained forms a coating that lacks sufficient waterfastness, and cannot sufficiently prevent agrichemicals from running off such as when there is rain.

The carboxy-containing monomer unit content in the carboxy-modified PVA (A) can be measured as follows, for example. After completely saponifying the carboxy-modified PVA (A), the carboxy-modified PVA (A) is thoroughly washed with methanol, and is dried under reduced pressure at 90° C. for 2 days to prepare an analyte PVA, which is then subjected to $^1$H-NMR measurement (e.g., 500 MHz) at 60° C. after being dissolved in DMSO-$d_6$. The carboxy unit content can then be calculated using the peak derived from the methine of the vinyl alcohol unit, and the peak derived from the backbone methine or methylene of the carboxy-containing monomer unit.

The carboxy-modified PVA (A) has a viscosity-average degree of polymerization (hereinafter, also referred to simply as "degree of polymerization") of 200 to 5,000, preferably 300 to 4,000, more preferably 350 to 3,000, even more preferably 500 to 2,500. With a viscosity-average degree of polymerization of less than 200, the agrochemical spray solution obtained forms a coating that lacks sufficient waterfastness, and cannot sufficiently prevent agrichemicals from running off such as when there is rain. Production of a carboxy-modified PVA (A) having a viscosity-average degree of polymerization of more than 5,000 is difficult to achieve. The viscosity-average degree of polymerization (P) of carboxy-modified PVA (A) is determined according to JIS K 6726 (1994). Specifically, the viscosity-average degree of polymerization (P) of carboxy-modified PVA (A) is determined from the limiting viscosity [η] (dL/g) measured in 30° C. water after purification of a re-saponified carboxy-modified PVA, using the following formula.

$$P=([\eta]\times10^3/8.29)^{(1/0.62)}$$

The carboxy-modified PVA (A) has a degree of saponification of 65 mol % to 99.9 mol %, more preferably 70 mol % to 99.8 mol %, even more preferably 80 mol % to 99.7 mol %. With a degree of saponification of less than 65 mol %, the solubility in water decreases, and it becomes difficult to prepare a spray solution in the form of an aqueous solution. With a degree of saponification of more than 99.9 mol %, the agrochemical spray solution obtained has an increased risk of remaining on a plant surface.

The carboxy-modified PVA (A) is obtained by, for example, copolymerizing a carboxy-containing monomer and a vinyl ester monomer to produce a vinyl ester copolymer (hereinafter, the vinyl ester copolymer will be referred to also as "PVAc"), and saponifying the vinyl ester copolymer with a saponification catalyst such as sodium hydroxide, followed by optional pulverization and drying.

The carboxy-containing monomer may be any carboxy-containing monomer, provided that it has a polymerizable group copolymerizable with a vinyl ester monomer, and that carboxylic acid or a salt thereof is present in the PVA after saponification. Examples of the carboxy-containing monomer include ethylenic unsaturated monocarboxylic acids and derivatives thereof, and ethylenic unsaturated dicarboxylic acids and derivatives thereof. Specifically, preferred for use are maleic acid or a salt thereof, and maleic acid esters such as monomethyl maleate, dimethyl maleate, monoethyl maleate, and diethyl maleate; itaconic acid or a salt thereof, and itaconic acid esters such as monomethyl itaconate, dimethyl itaconate, monoethyl itaconate, and diethyl itaconate; fumaric acid or a salt thereof, and fumaric acid esters such as monomethyl fumarate, dimethyl fumarate, monoethyl fumarate, and diethyl fumarate; maleic anhydride, and itaconic anhydride or derivatives thereof; and (meth)acrylic acid or a salt thereof, and (meth)acrylic acid esters such as methyl (meth)acrylate, ethyl (meth)acrylate, n-propyl (meth)acrylate, and isopropyl (meth)acrylate. Examples of the salts of the compounds above include alkali metal salts (such as sodium salts), alkali-earth metal salts (such as calcium salts), and ammonium salts. In view of the cold water solubility of the film obtained, preferred are maleic acid, monomethyl maleate, dimethyl maleate, itaconic acid, monomethyl itaconate, dimethyl itaconate, (meth)acrylic acid, and methyl (meth)acrylate. The carboxy-containing monomer may be used alone, or two or more thereof may be used in combination. In this specification, "(meth)acryl" means both methacryl and acryl.

The copolymerization of carboxy-containing monomer and vinyl ester monomer may be achieved by using a known method, for example, such as bulk polymerization, solution polymerization, suspension polymerization, or emulsion polymerization. Typically, the copolymerization may be achieved by bulk polymerization or solution polymerization, which takes place without a solvent, or in a solvent such as alcohol. The alcohol may be, for example, a lower alcohol such as methanol, ethanol, or propanol. The copolymerization may use a known polymerization initiator, for example, an azo- or peroxide-based initiator such as 2,2'-azobis(isobutyronitrile), 2,2'-azobis(4-methoxy-2,4-dimethylvaleronitrile), 2,2'-azobis(2,4-dimethyl-valeronitrile), benzoyl peroxide, and n-propyl peroxydicarbonate.

The polymerization temperature is not particularly limited, and is preferably 0° C. to 150° C., more preferably 20° C. to 150° C., even more preferably 30° C. to 100° C., particularly preferably 50° C. to 80° C.

Examples of the vinyl ester monomer include vinyl formate, vinyl acetate, vinyl propionate, vinyl valerate, vinyl caprylate, vinyl laurate, vinyl stearate, vinyl benzoate, vinyl pivalate, and vinyl versatate. Preferred is vinyl acetate.

The carboxy-modified PVA (A) may comprise a monomer unit other than the vinyl alcohol unit, the carboxy-containing monomer unit, and the vinyl ester unit, provided that such additional monomer units are not detrimental to the effects of the present invention. Examples of such additional monomer units include:

α-olefins such as ethylene, propylene, 1-butene, isobutene, and 1-hexene;

acrylamide, and derivatives of acrylamide such as N-methyl acrylamide and N-ethyl acrylamide;

methacrylamide, and derivatives of methacrylamide such as N-methyl methacrylamide and N-ethyl methacrylamide;

vinyl ethers such as methyl vinyl ether, ethyl vinyl ether, n-propyl vinyl ether, isopropyl vinyl ether, and n-butyl vinyl ether;

hydroxyl-containing vinyl ethers such as ethylene glycol vinyl ether, 1,3-propanediol vinyl ether, and 1,4-butanediol vinyl ether;

allyl ethers such as propyl allyl ether, butyl allyl ether, and hexyl allyl ether;

monomers having an oxyalkylene group;

hydroxyl-containing α-olefins such as 3-buten-1-ol, 4-penten-1-ol, 5-hexen-1-ol, 7-octen-1-ol, 9-decen-1-ol, and 3-methyl-3-buten-1-ol;

monomers having a silyl group, such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide-propyltrimethoxysilane, and 3-(meth)acrylamide-propyltriethoxysilane; and N-vinylamide monomers such as N-vinylformamide, N-vinylacetamide, N-vinyl-2-pyrrolidone, and N-vinyl-2-caprolactam.

The content of these additional monomer units depends on factors such as intended use and application, and is preferably 10 mol % or less, more preferably 5.0 mol % or less, even more preferably 1.0 mol % or less. The content of the additional monomer unit may be 0.5 mol % or less.

The vinyl ester copolymer obtained following the method discussed above can be saponified in an alcohol solvent, and optionally pulverized and dried to obtain the carboxy-modified PVA (A). The saponification and drying conditions used to obtain the modified PVA are not particularly limited. However, the saponification reaction temperature ranges preferably from 5 to 80° C., more preferably 20 to 70° C. Saponification may be achieved by, for example, adding a saponification catalyst to the PVAc solution. The PVAc solution has a PVAc concentration of preferably 10 to 60 mass %, more preferably 15 to 50 mass %, even more preferably 20 to 45 mass %. The saponification catalyst used is typically an alkali catalyst. Examples of the alkali catalyst include hydroxides of alkali metals such as potassium hydroxide and sodium hydroxide; and alkoxides of alkali metals such as sodium methoxide. Preferred is sodium hydroxide. The saponification catalyst is used in an amount of preferably 0.005 to 0.50, more preferably 0.008 to 0.40, even more preferably 0.01 to 0.30 in terms of a mole ratio (MR) relative to the vinyl ester monomer unit of the vinyl ester copolymer. Examples of the solvent that can be used for saponification reaction include methanol, ethanol, isopropanol, methyl acetate, dimethyl sulfoxide, diethyl sulfoxide, and dimethyl formamide. The solvent is not particularly limited, and may be used alone, or two or more thereof may be used in combination. The solvent is preferably methanol, or a mixed solvent of methanol and methyl acetate.

A certain preferred embodiment (X-1) is a spreading agent for agrochemicals comprising a carboxy-modified PVA (A) that has a carboxy-containing monomer unit content of 0.5 mol % to 5 mol %, a viscosity-average degree of polymerization of 500 to 2,500, and a degree of saponification of 80 mol % to 98 mol %. In another preferred embodiment (X-2), the spreading agent for agrochemicals of the embodiment (X-1) further comprises 0.001 parts by mass to 25 parts by mass of a polyvalent metal ionizable compound (B) relative to 100 parts by mass of the carboxy-modified vinyl alcohol polymer (A). In another preferred embodiment (X-3), the carboxy-containing monomer in the spreading agent for agrochemicals of the embodiment (X-1) or (X-2) is at least one selected from the group consisting of an ethylenic unsaturated monocarboxylic acid and a derivative thereof, and an ethylenic unsaturated dicarboxylic acid and a derivative thereof. In another preferred embodiment (X-4), the ethylenic unsaturated dicarboxylic acid and the derivative thereof in the spreading agent for agrochemicals of any one of the embodiments (X-1) to (X-3) are at least one selected from the group consisting of maleic acid or a salt thereof, a maleic acid ester, itaconic acid or a salt thereof, an itaconic acid ester, fumaric acid or a salt thereof, a fumaric acid ester, maleic anhydride, and itaconic anhydride or a derivative thereof. In all of the embodiments (X-1) to (X-4), the type and amount of each component may be varied as appropriate following the foregoing descriptions, and changes such as addition and deletion of components are also possible.

Polyvalent Metal Ionizable Compound (B)

In view of improved adhesion to plant surface, it is preferable that a spreading agent for agrochemicals of the present invention further comprise a polyvalent metal ionizable compound (B), in addition to the carboxy-modified PVA (A), and that the content of the polyvalent metal ionizable compound (B) be preferably 0.001 parts by mass to 25 parts by mass relative to 100 parts by mass of the carboxy-modified PVA (A). The polyvalent metal ionizable compound (B) is preferably an organic salt or an inorganic salt.

Preferably, the organic salt or inorganic salt comprises a cation that comprises an alkali earth metal ion, a transition metal ion, an aluminum ion ($Al^{3+}$), or a zinc ion ($Zn^{2+}$). Specifically, the cation is preferably at least one selected from the group consisting of a beryllium ion ($Be^{2+}$), a magnesium ion ($Mg^{2+}$), a calcium ion ($Ca^{2+}$), a strontium ion ($Sr^{2+}$), a barium ion ($Ba^{2+}$), a titanium ion ($Ti^{4+}$), a manganese ion ($Mn^{2+}$), an iron ion ($Fe^{2+}$ or $Fe^{3+}$), a cobalt ion ($Co^{2+}$), a nickel ion ($Ni^{2+}$), a copper ion ($Cu^{2+}$), an aluminum ion ($Al^{3+}$), and a zinc ion ($Zn^{2+}$). The cation is more preferably a magnesium ion ($Mg^{2+}$), a calcium ion ($Ca^{2+}$), an aluminum ion ($Al^{3+}$), a copper ion ($Cu^{2+}$), or an iron ion ($Fe^{2+}$ or $Fe^{3+}$). In this specification, beryllium ions ($Be^{2+}$) and magnesium ions ($Mg^{2+}$) are regarded as alkali earth metal ions.

Preferably, the organic salt or inorganic salt comprises an anion that is at least one selected from the group consisting of an acetate ion ($CH_3COO^-$), a carbonate ion ($CO_3^{2-}$), a hydroxide ion ($OH^-$), an iodide ion ($I^-$), a chloride ion ($Cl^-$), a bromide ion ($Br^-$), a nitrate ion ($NO_3^-$), a sulfate ion ($SO_4^{2-}$), an orthosilicate ion ($SiO_4^{4-}$), and a phosphate ion ($PO_4^{3-}$).

Examples of the polyvalent metal ionizable compound (B) include calcium acetate, calcium chloride, calcium formate, calcium sulfate, calcium carbonate, calcium phosphate, calcium silicate, calcium hydroxide, calcium bromide, calcium iodide, magnesium sulfate, magnesium carbonate, magnesium phosphate, magnesium chloride (magnesium chloride hexahydrate), magnesium citrate nonahydrate, tungsten sodium citrate, magnesium silicate, magnesium hydroxide, strontium nitrate, barium acetate, barium sulfate, barium phosphate, beryllium chloride, beryllium carbonate, beryllium sulfate, manganese chloride, manganese acetate, manganese formate dihydrate, ammonium manganese sulfate hexahydrate, copper(I) chloride, copper(II) chloride, ammonium copper(II) chloride dihydrate, copper(I) sulfate, copper(II) sulfate, cobalt chloride, cobalt sulfate, nickel sulfate hexahydrate, nickel chloride hexahydrate, nickel acetate tetrahydrate, ammonium nickel sulfate hexahydrate, nickel amidosulfate tetrahydrate, aluminum sulfate, aluminum phosphate, aluminum carbonate, aluminum silicate, aluminum hydroxide, potassium alum, aluminum sulfite, aluminum thiosulfate, aluminum polychloride, aluminum nitrate (aluminum nitrate nonahydrate), aluminum chloride hexahydrate, iron(I) bromide, iron(I) chloride, iron(II) chloride, iron(I) sulfate, iron(II) sulfate, iron(I) carbonate, iron(I) phosphate, iron(I) hydroxide, zinc bromide, zinc chloride, zinc silicate, zinc hydroxide, zinc nitrate hexahydrate, zinc sulfate, titanium tetrachloride, tetraisopropyl titanate, titanium acetylacetonate, titanium lactate, and titanium phosphate. Preferred examples include calcium acetate, calcium chloride, calcium formate, calcium sulfate, calcium carbonate, calcium phosphate, calcium silicate, calcium hydroxide, calcium bromide, calcium iodide, magnesium sulfate, magnesium carbonate, magnesium phosphate, magnesium chloride, magnesium citrate nonahydrate, tungsten sodium citrate, magnesium silicate, magnesium hydroxide, aluminum sulfate, aluminum phosphate, aluminum carbonate, aluminum silicate, aluminum hydroxide, potassium alum, aluminum sulfite, aluminum thiosulfate, aluminum polychloride, aluminum nitrate, aluminum chloride hexahydrate, iron(I) bromide, iron(I) chloride, iron(II) chloride, iron(I) sulfate, iron(II) sulfate, iron(I) carbonate, iron(I) phosphate, iron(I) hydroxide, copper(I) chloride, copper(II) chloride, ammonium copper(II) chloride dihydrate, copper(I) sulfate, and copper(II) sulfate. The polyvalent metal ionizable compound (B) may be used alone, or two or more thereof may be used in combination.

The organic salt or inorganic salt may be a mixture with a chelating agent of a molecular structure having a functional group capable of forming a bond with a metal ion.

The content of the polyvalent metal ionizable compound (B) is preferably 0.001 parts by mass to 25 parts by mass, more preferably 0.005 parts by mass to 20 parts by mass, even more preferably 0.01 parts by mass to 20 parts by mass relative to 100 parts by mass of the carboxy-modified PVA (A). With a polyvalent metal ionizable compound (B) content of less than 0.001 parts by mass relative to 100 parts by mass of the carboxy-modified PVA (A), the agrochemical spray solution obtained tends to develop insufficient adhesion. With a polyvalent metal ionizable compound (B) content of more than 25 parts by mass relative to 100 parts by mass of the carboxy-modified PVA (A), gelation tends to occur during the preparation of the agrochemical spray solution.

In view of improving the adhesion of the agrochemical spray solution for plant surface, it is preferable to add the polyvalent metal ionizable compound (B) by (i) mixing a powder of carboxy-modified PVA (A) and a powder of polyvalent metal ionizable compound (B), (ii) adding a powder of polyvalent metal ionizable compound (B) to an aqueous solution of carboxy-modified PVA (A) during the preparation of the agrochemical spray solution, or (iii) adding a powder of carboxy-modified PVA (A) to an aqueous solution of polyvalent metal ionizable compound (B).

A spreading agent for agrochemicals of the present invention may consist essentially of the carboxy-modified PVA (A), or may optionally comprise the polyvalent metal ionizable compound (B), in addition to the carboxy-modified PVA (A). As used herein, "consisting essentially of the carboxy-modified PVA (A)" means that the content of components other than the carboxy-modified PVA (A) (for example, other spreading agents, PVAs other than the carboxy-modified PVA (A), and water-soluble resins other than PVAs) is preferably less than 10 mass %, more preferably less than 0.1 mass %, even more preferably less than 0.01 mass %, particularly preferably less than 0.001 mass %. Examples of other spreading agents include common spreading agents, functional spreading agents, and adhesives. Examples of the common spreading agents include non-ionic surfactants (such as polyoxyethylene (POE) alkyl phenyl ether, and POE alkyl ester), and mixtures of such non-ionic surfactants and anionic surfactants. Examples of the functional spreading agents include non-ionic surfactants (such as POE alkyl ether, and sorbitan fatty acid ester), anionic surfactants (such as dialkyl sulfosuccinate salts), cationic surfactants (tetraalkylammonium salts), and mixtures of these. Examples of the adhesives include paraffin, and polyoxyethylene resin acid ester.

Agrochemical Spray Solution

Preferably, an agrochemical spray solution of the present invention comprises the spreading agent for agrochemicals, an active agrochemical component, and water. The agrochemical spray solution of the present invention may comprise a solvent other than water. In view of reducing the impact on the environment, an agrochemical spray solution of another embodiment may be essentially free of a solvent other than water. As used herein, "essentially free of a solvent other than water" means that the content of solvents other than water is preferably less than 10 mass %, more preferably less than 5 mass %, even more preferably less than 1 mass % relative to the total amount of the solvents contained in the agrochemical spray solution. The content of the carboxy-modified PVA (A) is preferably 0.01 mass % to 10 mass %, more preferably 0.05 mass % to 8 mass %, even more preferably 0.1 mass % to 5 mass % relative to the total amount of the agrochemical spray solution. The properties of the agrochemical spray solution, including adhesion and the effect to reduce the risk of remaining on a plant surface further improve with the carboxy-modified PVA (A) content falling in these ranges.

The total solid content in the agrochemical spray solution is preferably 0.001 mass % to 20 mass %, more preferably 0.01 mass % to 10 mass %. When the total solid content is less than 0.001 mass %, it often becomes difficult to provide necessary amounts of active agrichemical component. When the total solid content is more than 20 mass %, contamination by the excess active agrichemical component often becomes a problem.

The method of production of the agrochemical spray solution is not particularly limited. However, in view of obtaining a homogenous agrochemical spray solution having desirable solubility, it is preferable to mix the active agrichemical component with a solution (particularly an aqueous solution) of the carboxy-modified PVA (A)-containing spreading agent for agrochemicals. The total solid content of the carboxy-modified PVA (A) in the solution of the spreading agent for agrochemicals is preferably 0.1 mass % to 20 mass %, more preferably 1 mass % to 15 mass %.

The content of the active agrichemical component is preferably 0.1 parts by mass to 1,000 parts by mass, more preferably 1 part by mass to 500 parts by mass relative to 100 parts by mass of the carboxy-modified PVA (A). When the content of the active agrichemical component is less than 0.1 parts by mass relative to 100 parts by mass of the carboxy-modified PVA (A), it often becomes difficult to provide necessary amounts of active agrichemical component. Adhesion tends to decrease when the content of the active agrichemical component is more than 1,000 parts by mass relative to 100 parts by mass of the carboxy-modified PVA (A).

Examples of the active agrichemical component include herbicides, pesticides, disinfectants, plant regulators, and fertilizers. Preferably, the active agrichemical component has a liquid or a powder form at ordinary temperature (21° C.). It is particularly preferable that the active agrichemical component contained be a water-soluble active agrichemical component having a saturation solubility of 50 ppm or more against ordinary-temperature water (21° C.). The active agrichemical component may be used alone, or two or more thereof may be used in combination.

Examples of the herbicides include 2,4-PA, MCP, MCPB, MCPA-thioethyl (phenothiol), clomeprop, naproanilide, CNP, chlomethoxynil, bifenox, MCC, benthiocarb, esprocarb, molinate, dimepiperate, DCPA, butachlor, pretilachlor, bromobutide, mefenacet, dymron, simetryn, prometryn, dimethametryn, bentazon, oxadiazon, pyrazolate, pyrazoxyfen, benzofenap, trifluralin, piperophos, ACN, and bensulfuron-methyl.

Examples of the pesticides include MPP, MEP, ECP, pirimiphos-methyl, diazinon, isoxathion, pyridaphenthion, chlorpyrifos-methyl, chlorpyrifos, ESP, vamidothion, profenofos, malathion, PAP, dimethoate, formothion, thiometon, ethylthiometon, phosalone, PMP, DMTP, prothiofos, sulprofos, pyraclofos, DDVP, monocrotophos, BRP, CVMP, dimethylvinphos, CVP, propaphos, acephate, isofenphos, salithion, DEP, EPN, ethion, NAC, MTMC, MIPC, BPMC, PHC, MPMC, XMC, ethiofencarb, bendiocarb, pirimicarb, carbosulfan, benfuracarb, methomyl, thiodicarb, alanycarb, allethrins, resmethrin, permethrin, cypermethrin, cyhalothrin, cyfluthrin, fenpropathrin, tralomethrin, cycloprothrin, fenvalerate, flucythrinate, fluvalinate, etofenprox, cartap, thiocyclam, bensultap, diflubenzuron, teflubenzuron, chlorfluazuron, buprofezin, fenoxycarb, pyrethrum, derris, nicotine sulfate, machine oil, rapeseed oil, CPCBS, Kelthane, chlorobenzilate, phenisobromolate, tetradifon, BPPS, quinoxaline, amitraz, benzomate, fenothiocarb, hexythiazox, fenbutatin oxide, dienochlor, fenpyroximate, fluazinam, pyridaben, clofentezine, DPC, a polynactin complex, milbemectin, DCIP, dazomet, benzoepin, metaldehyde, DCV, BT, and fenitrothion.

Examples of the disinfectants include kasugamycin, benomyl, tiabendazole, thiophanate-methyl, thiuram, prochloraz, triflumizole, ipconazole, basic copper chloride, basic copper sulfate, copper(II) hydroxide, cupric nonylphenolsulfonate, DBEDC, copper terephthalate, inorganic sulfur, zineb, maneb, manzeb, amobum, polycarbamate, organic nickel, propineb, ziram, thiadiazine, captan, sulfenic acids, TPN, fthalide, IBP, EDDP, tolclofos-methyl, pyrazophos, fosetyl, carbendazole, diethofencarb, iprodione, vinclozolin, procymidone, fluoroimide, oxycarboxin, mepronil, flutolanil, tecloftalam, trichlamide, pencycuron, metalaxyl, oxadixyl, triadimefon, bitertanol, myclobutanil, hexaconazole, propiconazole, fenarimol, pyrifenox, triforine, blasticidin S, polyoxins, validamycin, streptomycin, oxytetracycline, mildiomycin, PCNB, hydroxyisoxazole, echlomezol, chloroneb, methasulfocarb, methyl isothiocyanate, organoarsenic compounds, zinc sulfate, dithianon, benzothiazole, quinoxalines, CNA, dimethirimol, diclomezine, triazine, ferimzone, fluazinam, probenazole, isoprothiolane, tricyclazole, pyroquilon, oxolinic acid, iminoctadine acetate, alginic acid, microbial antagonists, extracts of *Lentinura edodes* mycelium, substances produced by *Aspergillus oryzae*, *Agrobacterium radiobacter*, and imibenconazole.

Examples of the plant regulators include inabenfide, oxyethylene docosanol, nicotinamide, and benzylaminopurine.

Examples of the fertilizers include oxamide, crotonylidene diurea (CDU), isobutylidene diurea (IB), ureaform, fused phosphate fertilizers, mixed phosphoric acid fertilizers, by-product lime fertilizers, calcium carbonate fertilizers, mixed lime fertilizers, slag silicate fertilizers, silicate fertilizers, magnesium hydroxide fertilizers, by-product magnesium fertilizers, processed magnesium fertilizers, slag manganese fertilizers, and fused trace-element fertilizers. It is also possible to use processed slag phosphoric acid fertilizers, which are intended for supply of silicic acid and pH correction with alkalis, as with the case of slag silicate fertilizers. Preferred are oxamide, crotonylidene diurea (CDU), isobutylidene diurea (IB), ureaform, processed slag phosphoric acid fertilizers, slag silicate fertilizers, and mixed phosphoric acid fertilizers.

The agrochemical spray solution of the present invention may contain other components, provided that it is not detrimental to the effects of the present invention. Examples of such other components include other spreading agents such as above, PVAs other than the carboxy-modified PVA (A), water-soluble resins other than PVAs, emulsifiers, wettable powders, flowables, surfactants, thickeners, cross-linking agents, and preservatives. The content of other components is preferably 10 mass % or less, more preferably 5 mass % or less, even more preferably less than 1 mass %, particularly preferably less than 0.1 mass % relative to the total amount of the agrochemical spray solution.

The present invention encompasses embodiments combining the foregoing features, provided that such combinations made in various forms within the technical idea of the present invention can produce the effects of the present invention.

EXAMPLES

The following describes the present invention in greater detail by way of Examples. It should be noted that the present invention is in no way limited by the following Examples, so long as the Examples below remain within the gist of the present invention. In the Examples and Comparative Examples below, the following methods were used for the measurements and evaluations of the viscosity-average degree of polymerization, the degree of saponification, and the adhesion of carboxy-modified PVA (A).

Viscosity-Average Degree of Polymerization of Carboxy-Modified PVA (A)

The viscosity-average degree of polymerization of carboxy-modified PVA was determined using the method described in JIS K 6726 (1994).

Degree of Saponification of Carboxy-Modified PVA (A)

The degree of saponification of carboxy-modified PVA was determined using the method described in JIS K 6726 (1994).

Evaluation of Adhesion
Evaluation after Spraying Water 5 or 10 Times

The agrochemical spray solution obtained in each of the Examples and Comparative Examples described below was sprayed onto surfaces of plant leaves (*schefflera* leaves) with a sprayer to impart a color. After allowing the solution to stand for 24 hours, water was sprayed onto the same leaf surface (the surface sprayed with the agrochemical spray solution) with a sprayer for a total of 10 times. After water was sprayed 5 times and 10 times, the leaf surface was visually inspected for the remaining agrochemical spray solution that had spread on the surface but did not drip, and the percentage of the spread area with respect to the area of the surface sprayed with the agrochemical spray solution was measured.

The result was then evaluated according to the following criteria.
A: Remaining colored surface=80% or more
B: Remaining colored surface=30% or more and less than 80%
C: Remaining colored surface=less than 30%
Overall Evaluation In the evaluations of initial adhesion for plant surface, and the risk of remaining on plant surface, the spreading agent of the present invention was considered most desirable when the evaluation result for adhesion was "A" after 5 times of water spraying, and "B" after 10 times of water spraying. The results of adhesion evaluations after 5 times and 10 times of water spraying were used to determine the overall result, using the following criteria.
4: "A" after 5 times, "B" after 10 times
3: "B" after 5 times, "B" after 10 times
2: "B" after 5 times, "C" after 10 times
1: "C" after 5 times, "C" after 10 times Example 1

Production of PVA-1: Carboxy-Modified PVA (A)

A separable flask equipped with a reflux condenser, a stirrer, a thermometer, a nitrogen conduit, and a feed port and a pump for post-loading solution was charged with 1,300 g of vinyl acetate, 500 g of methanol, and 11 mL of a 10 mass % methanol solution of itaconic acid. The system was replaced with nitrogen, and heated in a thermostat bath while stirring the polymerization solution. Upon the system reaching a constant temperature of 60° C., 0.5 g of 2,2'-azobis(isobutyronitrile) (AIBN) was added to start polymerization. After the polymerization started, the reaction was allowed to proceed by dropwise addition of a 10 mass % methanol solution of itaconic acid while analyzing the solid content of the polymerization system. After dropping the 10 mass % methanol solution of itaconic acid (96.6 mL) in substantially a uniform fashion over a time period of 2.3 hours from the start of polymerization, 1,000 g of methanol was added to cease the polymerization. After the reaction, a stream of methanol vapor was passed through the polymer paste to remove the unreacted vinyl acetate monomer, and a methanol solution (PVAc solution) of a vinyl acetate-itaconic acid copolymer having a carboxylic acid unit content of 1.5 mol % was obtained.

This was followed by saponification, which was carried out at 40° C. by adding 11.6 g of an alkaline solution (a 10 mass % methanol solution of NaOH) to 400 g of the PVAc methanol solution (containing 100 g of PVAc) that had been adjusted to a concentration of 25 mass % by adding methanol to the PVAc solution (the mole ratio [MR] of the alkali to the vinyl acetate unit in PVAc is 0.025). After the addition of the alkaline solution, the resulting gel was pulverized with a pulverizer, and a saponification reaction was allowed for a total of 1 hour. The remaining alkali was neutralized by adding 1,000 g of methanol. After confirming the completion of neutralization with a phenolphthalein indicator, 1,000 g of methanol was added to the white-solid PVA obtained by filtration, and the mixture was left to stand at room temperature for 3 hours for washing. The washing procedure was repeated three times, and the resulting PVA, after centrifugal removal of liquid component, was left to stand in a drier at 70° C. for 2 days to obtain a carboxy-modified PVA (PVA-1) of the present invention. Table 2 shows the physical properties of PVA-1.

Preparation of Agrochemical Spray Solution

PVA-1 was used to prepare a 1 mass % aqueous solution. To the PVA aqueous solution were added 0.1 parts by mass of a nonionic surfactant (Demol N, manufactured by Kao Corporation), and 0.4 parts by mass of an active agrichemical component (an emulsion formulation Orthion manufactured by Sumitomo Chemical Garden Products, Co., Ltd., containing acephate and MEP as active components), relative to 100 parts by mass of the PVA aqueous solution prepared. For adhesion evaluation of the agrochemical spray solution, 0.1 parts by mass of rhodamine B was added as colorant, and the adhesion was evaluated according to the method described above. The results are presented in Table 2.

Examples 2 to 8

Production of PVA-2 to PVA-7, and Preparation of Agrochemical Spray Solution

PVAs (PVA-2 to PVA-7) were produced in the same manner as in Example 1, except that the amounts of carboxy-containing monomer, vinyl acetate, methanol, and polymerization initiator, and polymerization temperature, polymerization time, polymerization conversion rate, the concentration of PVAc solution and the amount of saponification catalyst in saponification, and saponification temperature were varied as shown in Table 1. Table 2 shows the physical properties of PVA-2 to PVA-7. Agrochemical spray solutions were prepared in the same manner as in Example 1, except that PVA-2 to PVA-7 were used instead of PVA-1, and that the type and amount of polyvalent metal ionizable compound (B) were varied as shown in Table 2. The polyvalent metal ionizable compound (B) was added to a 1 mass % aqueous solution of each PVA prepared in the same manner as in Example 1. The adhesion of the agrochemical spray solution was evaluated according to the method described above. The results are presented in Table 2.

Comparative Example 1

Production of PVA-i, and Preparation of Agrochemical Spray Solution

A separable flask equipped with a stirrer, a nitrogen conduit, and an initiator feed port was charged with 630 g of vinyl acetate and 1,170 g of methanol. The system was replaced with nitrogen by bubbling nitrogen for 30 minutes after increasing the temperature to 60° C. Thereafter, the temperature inside the flask was adjusted to 60° C., and 0.5 g of AIBN was added to start polymerization. Upon the polymerization conversion rate reaching 40% after 3.2 hours from the start of polymerization, 1,000 g of methanol was added, and the mixture was cooled to cease the polymerization. The unreacted vinyl acetate monomer was then removed to obtain a PVAc methanol solution. This was followed by saponification, which was carried out at 40° C. by adding 11.6 g of an alkaline solution (a 10 mass % methanol solution of NaOH) to 400 g of the PVAc methanol solution (containing 100 g of PVAc) that had been adjusted to a concentration of 25 mass % by adding methanol to the PVAc solution (the mole ratio [MR] of the alkali to the vinyl acetate unit in PVAc is 0.025). After the addition of alkali, the resulting gel was pulverized with a pulverizer, and a saponification reaction was allowed for a total of 1 hour. The remaining alkali was neutralized by adding 1,000 g of methyl acetate. After confirming the completion of neutralization with a phenolphthalein indicator, 1,000 g of methanol was added to the white-solid PVA obtained by filtration, and the mixture was left to stand at room temperature for 3 hours for washing. The washing procedure was repeated three times, and the resulting PVA, after centrifugal removal of liquid component, was left to stand in a drier at 70° C. for 2 days to obtain a PVA (PVA-i). Table 2 shows the physical properties of PVA-i. An agrochemical spray solution was prepared in the same manner as in Example 1, except that PVA-i was used instead of PVA-1. The adhesion of the agrochemical spray solution was evaluated according to the method described above. The results are presented in Table 2.

Comparative Example 2

Production of PVA-ii

A terminal carboxy-modified PVA (PVA-ii) was produced following the method described in Example 5 of JP 2015-134704 A (Patent Literature 2). Table 2 shows the physical properties of PVA-ii. An agrochemical spray solution was prepared in the same manner as in Example 1, except that PVA-ii was used instead of PVA-1. The adhesion of the agrochemical spray solution was evaluated according to the method described above. The results are presented in Table 2.

Comparative Example 3

Production of PVA-iii

A PVA-iii was prepared in the same manner as in Comparative Example 1, except that the vinyl acetate amount, polymerization time, polymerization conversion rate, the type of polyvalent metal ionizable compound (B), and the concentration of PVAc solution and the amount of saponification catalyst in saponification were varied as shown in Table 1. Table 2 shows the physical properties of PVA-iii. An agrochemical spray solution was prepared in the same manner as in Example 1, except that PVA-iii was used instead of PVA-1. The adhesion of the agrochemical spray solution was evaluated according to the method described above. The results are presented in Table 2.

TABLE 1

| | Poymerization conditions | | | | | | | | |
|---|---|---|---|---|---|---|---|---|---|
| | | | Modifying species | | | Initiator | | | |
| | Vinyl acetate (g) | Methanol (g) | Type[1] | Amount added[3] (ml) | Consecutive addition[3] (ml/hr) | Type[2] | Amount added (g) | Temp. (° C.) | Time (hr) |
| PVA-1 | 1300 | 500 | IA | 11 | 42 | AIBN | 0.5 | 60 | 2.3 |
| PVA-2 | 1300 | 500 | IA | 7 | 28 | AIBN | 0.5 | 60 | 2.3 |
| PVA-3 | 1300 | 500 | MMM | 38 | 53 | AIBN | 0.5 | 60 | 2.3 |
| PVA-4 | 1550 | 250 | IA | 27 | 99 | AIBN | 0.5 | 60 | 2.2 |
| PVA-5 | 1300 | 500 | MMM | 47 | 67 | AIBN | 0.5 | 60 | 2.3 |
| PVA-6 | 1350 | 450 | IA | 40 | 150 | AIBN | 0.5 | 60 | 2.3 |
| PVA-7 | 650 | 1150 | MA | 3.7 | 19 | AIBN | 1.0 | 60 | 2.3 |
| PVA-i | 630 | 1170 | — | — | — | AIBN | 0.5 | 60 | 3.2 |
| PVA-ii | 650 | 1150 | 3-MPA | — | 3.2 | AIBN | 0.2 | 60 | 3.9 |
| PVA-iii | 630 | 1170 | — | — | — | AIBN | 0.5 | 60 | 3.2 |

| Poymerization conditions | Saponification conditions | | |
|---|---|---|---|
| Polymerization conversion rate (%) | PVAc concentration (mass %) | Alkali amount (MR) | Temp. (° C.) |

TABLE 1-continued

| | | | | |
|---|---|---|---|---|
| PVA-1 | 30 | 25 | 0.025 | 40 |
| PVA-2 | 30 | 40 | 0.01 | 40 |
| PVA-3 | 25 | 25 | 0.025 | 40 |
| PVA-4 | 30 | 25 | 0.025 | 40 |
| PVA-5 | 30 | 40 | 0.01 | 40 |
| PVA-6 | 30 | 40 | 0.01 | 40 |
| PVA-7 | 40 | 18 | 0.006 | 40 |
| PVA-i | 40 | 25 | 0.025 | 40 |
| PVA-ii | 40 | 40 | 0.0013 | 40 |
| PVA-iii | 40 | 40 | 0.01 | 40 |

[1] IA: Itaconic acid, MMM: Monomethyl maleate, MA: Methyl acrylate, 3-MPA: 3-mercaptopropionic acid
[2] AIBN: 2,2'-azobis(isobutyronitrile)
[3] 10 Mass % methanol solution of carboxy-containing monomer

TABLE 2

| | Carboxy-modified PVA (A) | | | Polyvalent metal ionizable compound (B) | | Adhesion | | |
|---|---|---|---|---|---|---|---|---|
| | Type | Carboxy content (mol %) | Polymerization conversion rate | Degree of saponification (mol %) | Type | Content[1] (parts by mass) | 5 Times | 10 Times | Overall evaluation |
| Ex. 1 | PVA-1 | 1.5 | 1700 | 98 | — | — | A | B | 4 |
| Ex. 2 | PVA-2 | 1.0 | 1700 | 88 | — | — | B | B | 3 |
| Ex. 3 | PVA-3 | 2.0 | 1700 | 98 | Magnesium chloride | 0.001 | A | B | 4 |
| Ex. 4 | PVA-4 | 3.0 | 2400 | 98 | — | — | B | B | 3 |
| Ex. 5 | PVA-5 | 2.5 | 1700 | 88 | — | — | B | B | 3 |
| Ex. 6 | PVA-5 | 2.5 | 1700 | 88 | Magnesium chloride | 20 | A | B | 4 |
| Ex. 7 | PVA-6 | 5.0 | 1700 | 88 | Aluminum nitrate | 10 | B | B | 3 |
| Ex. 8 | PVA-7 | 1.0 | 500 | 80 | — | — | B | B | 3 |
| Com. Ex. 1 | PVA-i | — | 500 | 98 | — | — | B | C | 2 |
| Com. Ex. 2 | PVA-ii | 0.25 | 530 | 38 | — | — | Not evaluated[2] | Not evaluated[2] | Not evaluated[2] |
| Com. Ex. 3 | PVA-iii | — | 500 | 88 | — | — | C | C | 1 |

[1] Content of compound (B) relative to 100 parts by mass of PVA (A) (parts by mass)
[2] Not evaluated because of insolubility in water and failure to prepare agrochemical spray solution

INDUSTRIAL APPLICABILITY

A spreading agent for agrochemicals of the present invention comprises a specific carboxy-modified PVA (A), and has superior adhesion, particularly for plant surface. An agrochemical spray solution obtained by using the spreading agent for agrochemicals can reduce the risk of remaining on a plant surface while maintaining superior adhesion for plant surface. Another advantage of the spreading agent for agrochemicals of the present invention is that, because the spreading agent allows for use of water as a solvent, it has a reduced impact on the environment in use. This makes the agrochemical spray solution effective for use as a liquid spray solution (for example, a spray solution for leaves, stems, and fruits) in agriculture.

The invention claimed is:

1. An agrochemical spray solution, comprising
a spreading agent comprising a carboxy-modified vinyl alcohol polymer (A) having a carboxy-containing monomer unit content of 0.1 mol % to 10 mol %, a viscosity-average degree of polymerization of 200 to 5,000, and a degree of saponification of 65 mol % to 99.9 mol %;
a water-soluble active agrichemical component having a saturation solubility of 50 ppm or more in water at a temperature of 21° C.; and
water,
wherein the agrochemical spray solution comprises 0.1 parts by mass to 1,000 parts by mass of the active agrichemical component relative to 100 parts by mass of the carboxy-modified vinyl alcohol polymer (A).

2. The agrochemical spray solution according to claim 1, wherein the spreading agent further comprises 0.001 parts by mass to 25 parts by mass of a polyvalent metal ionizable compound (B) relative to 100 parts by mass of the carboxy-modified vinyl alcohol polymer (A).

3. The agrochemical spray solution according to claim 2, wherein the polyvalent metal ionizable compound (B) is an organic salt or an inorganic salt.

4. The agrochemical spray solution according to claim 3, wherein the organic salt or the inorganic salt comprises a cation that is at least one selected from the group consisting of an alkaline earth metal ion, a transition metal ion, an aluminum ion ($Al^{3+}$) and a zinc ion ($Zn^{2+}$).

5. The agrochemical spray solution according to claim 3, wherein the organic salt or the inorganic salt comprises an anion that is at least one selected from the group consisting of an acetate ion ($CH_3COO^-$), a carbonate ion ($CO_3^{2-}$), hydroxide ion ($OH^-$), an iodide ion ($I^-$), a chloride ion ($Cl^-$), a bromide ion ($Br^-$), a nitrate ion ($NO_3^-$), a sulfate ion ($SO_4^{2-}$), an orthosilicate ion ($SiO_4^{4-}$), and a phosphate ion ($PO_4^{3-}$).

6. The agrochemical spray solution according to claim 1, wherein the carboxy-containing monomer is at least one selected from the group consisting of an ethylenic unsaturated monocarboxylic acid, an ethylenic unsaturated monocarboxylic acid derivative, an ethylenic unsaturated dicarboxylic acid, and an ethylenic unsaturated dicarboxylic acid derivative.

7. The agrochemical spray solution according to claim 6, wherein the ethylenic unsaturated monocarboxylic acid or the ethylenic unsaturated monocarboxylic acid derivative are at least one selected from the group consisting of (meth)acrylic acid, a (meth)acrylic acid salt, methyl (meth) acrylate, ethyl (meth)acrylate, n-propyl (meth)acrylate, and isopropyl (meth)acrylate.

8. The agrochemical spray solution according to claim 6, wherein the ethylenic unsaturated dicarboxylic acid or the ethylenic unsaturated dicarboxylic acid derivative are at least one selected from the group consisting of maleic acid, a maleic acid salt, a maleic acid ester, itaconic acid, an itaconic acid salt, an itaconic acid ester, fumaric acid, a fumaric acid salt, a fumaric acid ester, maleic anhydride, itaconic anhydride and itaconic anhydride.

9. The agrochemical spray solution according to claim 1, wherein the carboxy-containing monomer is at least one selected from the group consisting of maleic acid, monomethyl maleate, dimethyl maleate, itaconic acid, monomethyl itaconate, dimethyl itaconate, (meth)acrylic acid, and methyl (meth)acrylate.

\* \* \* \* \*